Oct. 30, 1956

C. H. INGWER ET AL 2,768,550

POWER THREADING TOOL

Filed March 14, 1951

INVENTORS
CARL H. INGWER
CLYDE E. WRIGHT
HERMAN WEIBEL
BY

Oct. 30, 1956  C. H. INGWER ET AL  2,768,550
POWER THREADING TOOL

Filed March 14, 1951  8 Sheets-Sheet 2

INVENTORS
CARL H. INGWER
CLYDE E. WRIGHT
HERMAN WEIBEL
BY J. W. Douglass
their Atty

INVENTORS
CARL H. INGWER
CLYDE E. WRIGHT
HERMAN WEIBEL

Oct. 30, 1956  C. H. INGWER ET AL  2,768,550
POWER THREADING TOOL

Filed March 14, 1951  8 Sheets-Sheet 5

INVENTORS
CARL H. INGWER
CLYDE E. WRIGHT
HERMAN WEIBEL
BY

Oct. 30, 1956     C. H. INGWER ET AL     2,768,550
POWER THREADING TOOL

Filed March 14, 1951     8 Sheets-Sheet 6

INVENTORS
CARL H. INGWER
CLYDE E. WRIGHT
HERMAN WEIBEL
BY

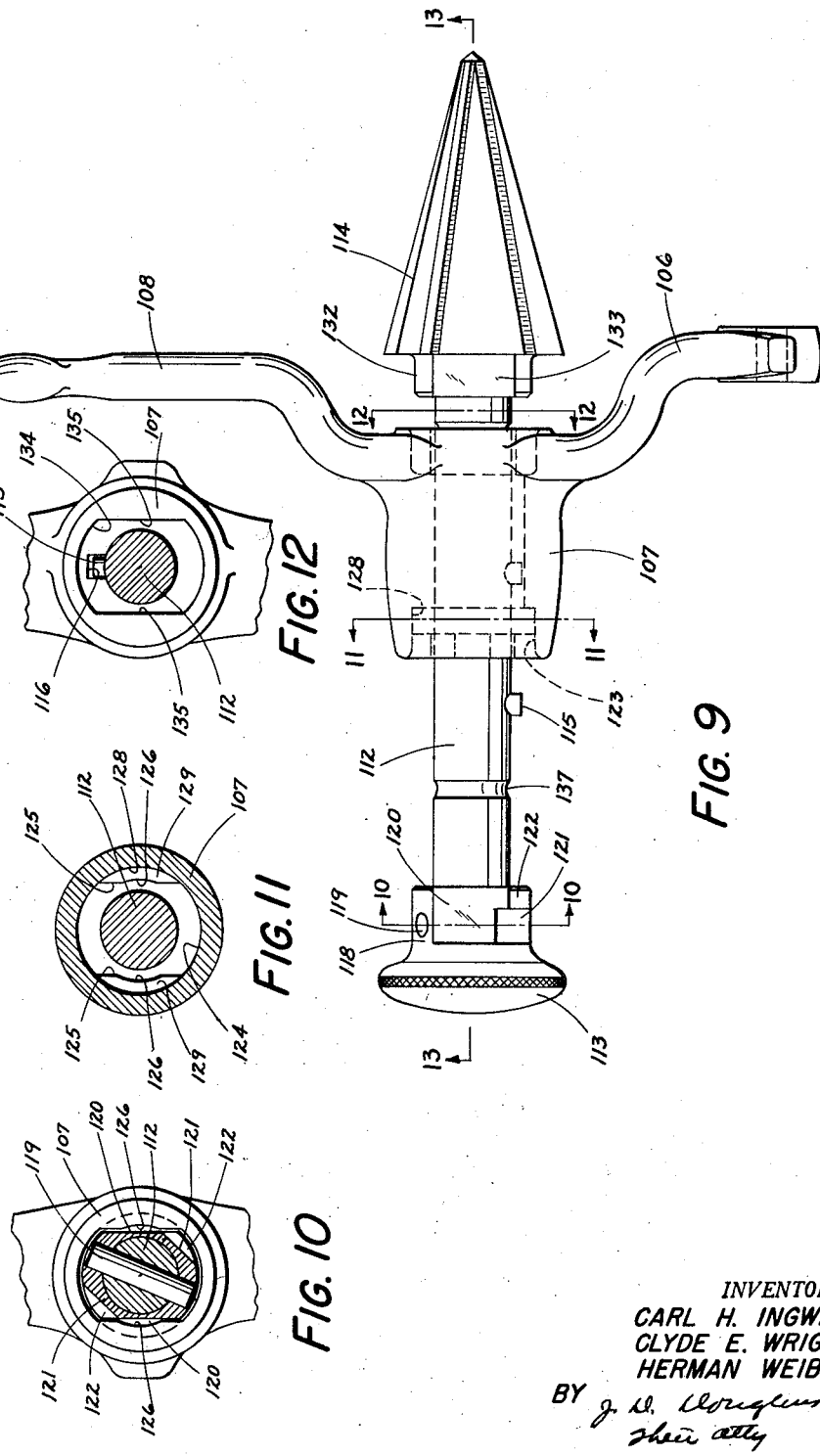

Oct. 30, 1956
C. H. INGWER ET AL
2,768,550
POWER THREADING TOOL
Filed March 14, 1951
8 Sheets-Sheet 8
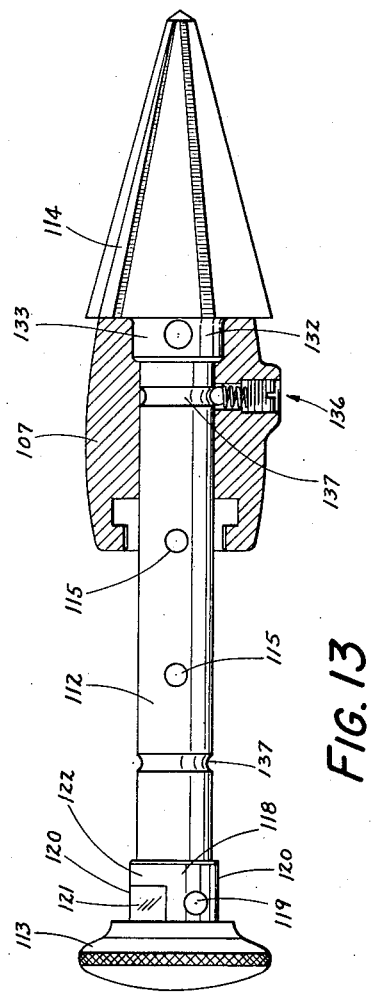
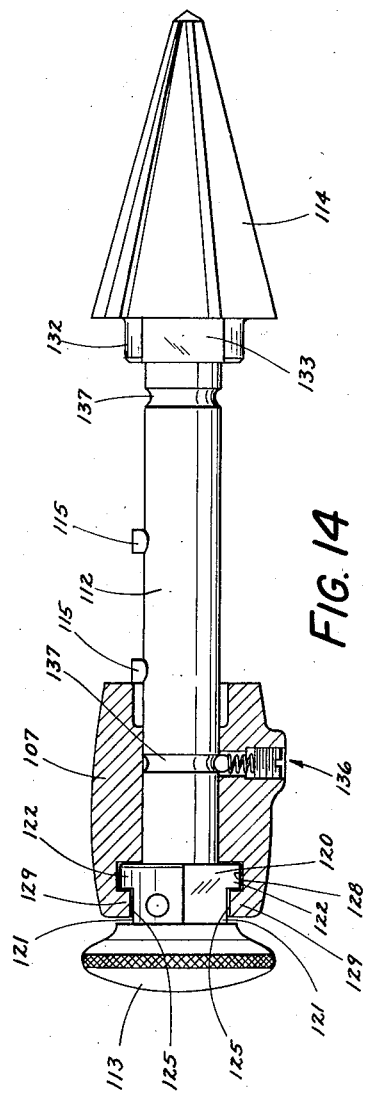
INVENTORS
CARL H. INGWER
CLYDE E. WRIGHT
HERMAN WEIBEL United States Patent Office 2,768,550
Patented Oct. 30, 1956

2,768,550

POWER THREADING TOOL

Carl H. Ingwer and Clyde E. Wright, Elyria, and Herman Weibel, Lakewood, Ohio, assignors to Ridge Tool Company, Elyria, Ohio Application March 14, 1951, Serial No. 215,412

4 Claims. (Cl. 82—2)

This invention relates to pipe working tools, and more particularly to a pipe working tool having a power driven chuck and a cutting oil pumping system and a carriage having various tools mounted thereon.

The rapid increase in the use of power driven pipe working tools has been accompanied by many improvements in that class of tools. However, many problems remained unsolved. The present invention, by the construction used, eliminates several of the previous difficulties.

Prior devices for the powered driving of pipe for threading and cutting have usually consisted of a power driven chuck having a stop means in the form of a hook or fork to prevent a customary type hand operated pipe tool from rotating as the pipe was turned relative to the tool.

More recently the complete power driven tool has appeared in which the pipe is driven by a chuck similar to the one formerly used separately. The pipe cutters, threaders, reamers, etc., are then mounted on a sliding carriage which in turn is mounted on ways so that it can be moved toward or away from the chuck. These devices have had poorly arranged carriages. I have discovered a considerably more efficient arrangement. In addition, by means of a novel free floating mounting of the pipe cutter, the machine of my invention is enabled to cut pipe which is out-of-round or slightly bent. This has not been possible heretofore because of the rigid mounting of the cutter. Moreover, the prior machines have had clumsy, inconvenient means, or no means at all, for handling the supply of cutting oil to the work piece being operated on. By the construction of the new machine of my invention, the oil is transmitted through the supporting ways of the carriage to the carriage and through passageways in the carriage to a nozzle which applies the oil directly to the workpiece.

A more complete understanding of the invention may be had by referring to the following specification and figures in which:

Fig. 9 is an elevational view of a novel reamer used in the embodiment of Fig. 8;

Figure 1:
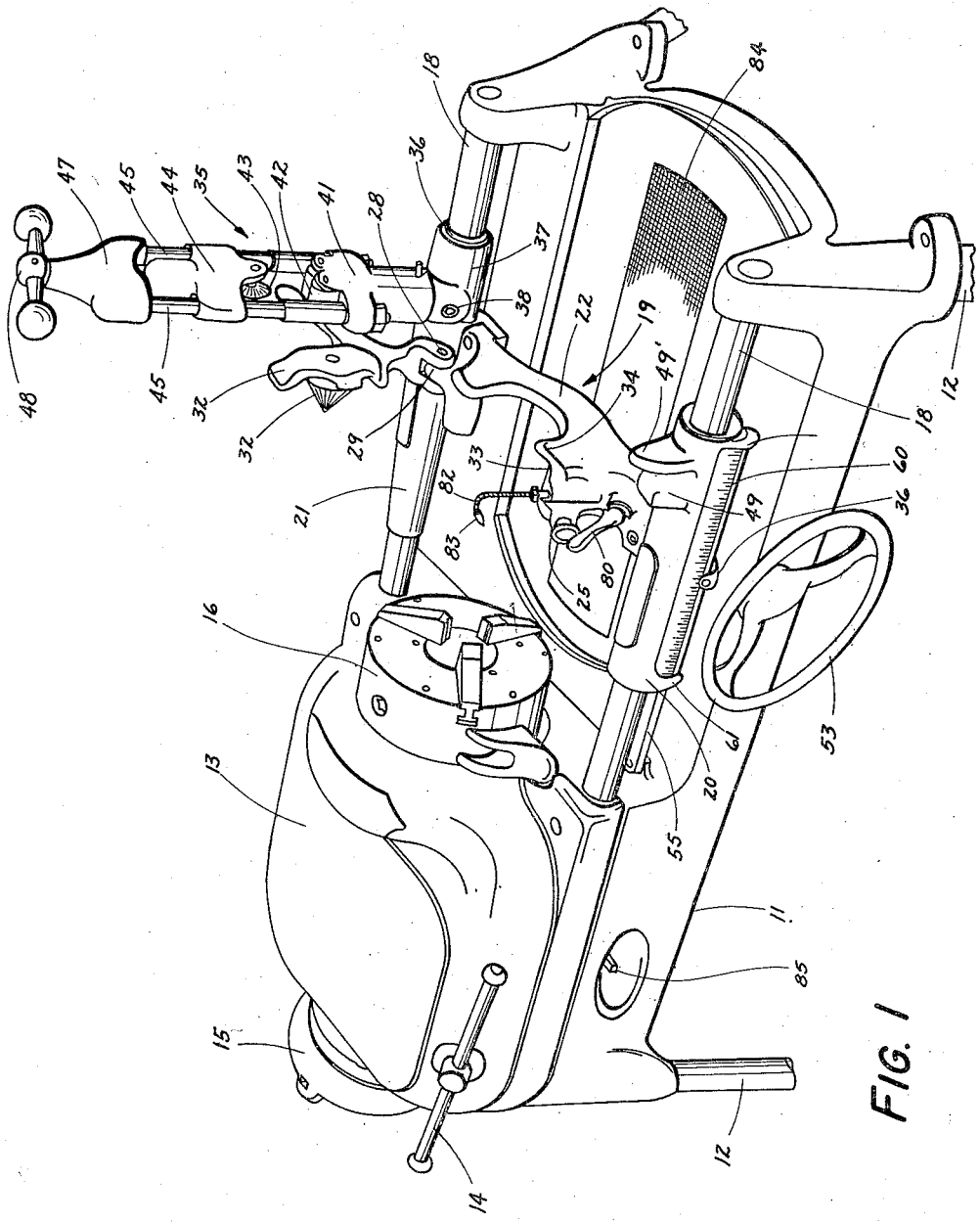
Fig. 1 is a perspective view of a pipe working machine embodying the invention.
Figure 2:
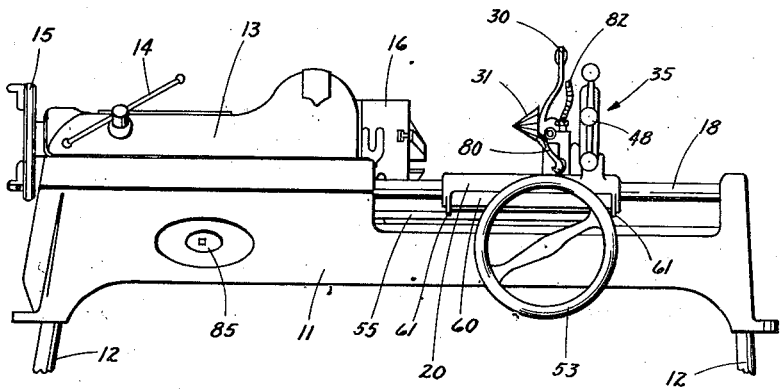
Fig. 2 is a detailed side elevational view of the machine.
Figure 3:
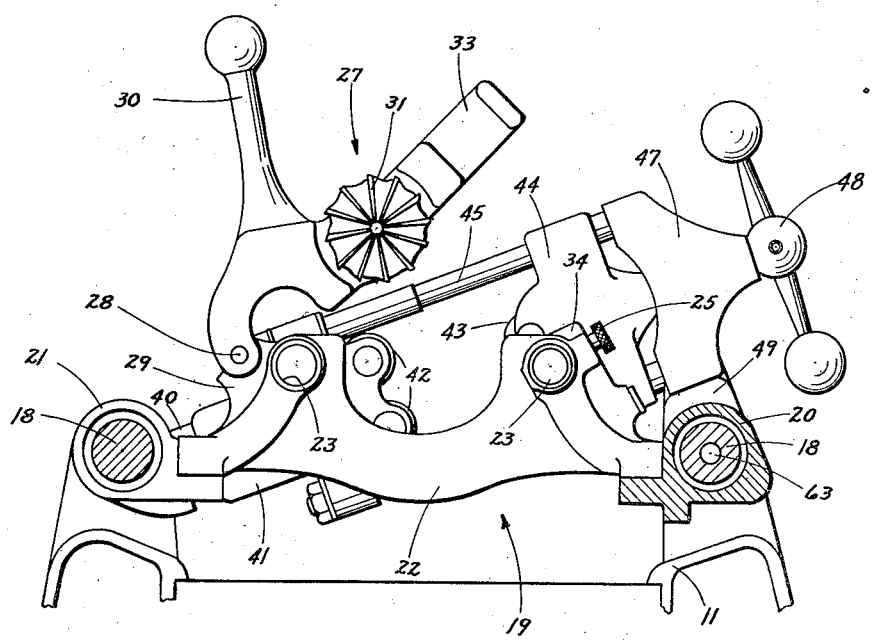
Fig. 3 is an end elevational view from one end of the carriage.

Fig. 10 is a sectional view along line 10—10 of Fig. 9;
Fig. 11 is a sectional view along line 11—11 of Fig. 9;
Fig. 12 is a sectional view along line 12—12 of Fig. 9;
Fig. 13 is a sectional view along line 13—13 of Fig. 9 with the reamer fully retracted; and
Fig. 14 is a view similar to Fig. 13 with the reamer in its alternate position, fully extended.

Briefly, the invention consists of a power drive machine primarily designed for cutting, threading and otherwise working pipe, although it may also be used to cut and thread bolts or the like. The machine consists of a framework including legs and a bed which supports a power driven chuck. Extending from the housing of the chuck are a pair of supporting ways. A carriage carrying the tools is slidably journalled on these ways. The tools on the carriage are arranged with the thread cutting dies on the side nearest the chuck, the reamer in the center and the pipe cutter tool at the other end. The pipe cutter is mounted so as to be fully floating so that it will adjust itself to any out-of-round or bent formation of the pipe or other workpiece to be cut.

The cutting oil for this machine is brought from an oil pump through passages in the ways to an outlet. The carriage is formed to catch the oil from the outlet and conduct it through passages in the carriage and a valve therein to a flexible tube which is always carried with the carriage and is therefore much more convenient than prior devices where the oil spout was fixed to the frame.

More specifically, and with reference to the drawings, the invention consists of a machine having a bed or base 11 supported by legs 12. A power drive is mounted on one end of the base 11 and comprises a housing 13 enclosing a motor 9 and oil pump 10. The motor drives both the chuck 16 and the pump through an arrangement of gears 14 within the housing. A work holder or guide 15 connected to the end of a hollow shaft opposite to the chuck 16 extends from the other end of the housing.

Extending from the housing toward the end of the base 11 opposite the housing are a pair of bars 18 which serve as supports or ways for the carriage 19. The carriage is composed of two members 20 and 21 extending longitudinally of the bars 18 and joined by a transverse member 22. The transverse member is formed with a pair of holes 23 to receive posts on a pipe threading device (not shown) and to hold the threader loosely in place. A sliding pin having a knurled head 25 is provided to hold the threader in place in a manner well known in the art. The holes 23 extend from the surface nearest the chuck 16.

Spaced somewhat further from the chuck 16 is a pipe reamer 27. This reamer is journalled on a pin 28 extending through an ear 29 on the transverse member 22. A handle 30 on the reamer extends beyond the cutter portion 31 and provides means to lift the reamer out of the way and lay it over the back of the carriage. In its lowered position, an arm 32 of the reamer rests on a boss 33 on the transverse member and is supported against motion longitudinally of the ways by an ear 34.

The third tool required in a normal pipe threading operation is a cutter. In the current machine, the cutter 35 is journalled on a turned down boss 36 on the rear longitudinal member 21. The mounting for this tool is novel in that it allows free movement of the device in two directions. A journal or mounting member 37 is journalled on the boss 36 and holds a pin or set screw 38 extending into a slot in the boss cut only partially around the boss. This slot retains the member 37 longitudinally of the boss 36 and restricts its rotating motion.

Figure 4:
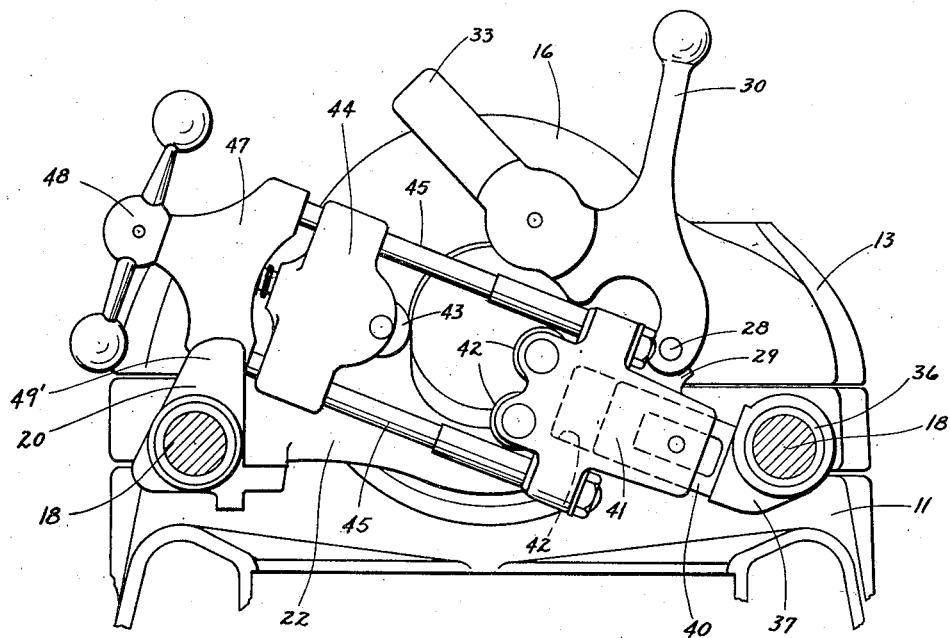
Fig. 4 is an end elevational view of the carriage from the end opposite Fig. 3.

The member 37 is formed with a rectangular arm 40 extending transversely of the bar 18 in an upward direction from a location somewhat beneath the bar (Fig. 4). A roller support member 41 is formed with a rectangular opening 42 which is a smooth sliding fit with the arm 40. Thus the roller member 41 is free to slide on the arm 40 or to pivot about the boss 36 thus having complete freedom of motion in one plane. The customary type of pipe cutting mechanism is built up on the roller member 41. A pair of rollers 42 are journalled on the member 41, and a cutter wheel 43 is journalled in a housing 44 which is slidably mounted on rods 45 extending from the member 41. A screw 46 journalled rotatably in end member 47 fixed to the ends of the rods 45, forces the cutter housing 44 towards the rollers 42 and cuts the pipe in a manner well known in the art. A handle 48 is fixed on the screw 46 to provide the operator a ready means for turning the screw. The cutter also may rest on a boss 49 against an ear 49' on the front sliding member 20.

It is apparent that the cutter is free to follow any movement which the end of the pipe may make in a plane perpendicular to the axis of the pipe. Thus, any out-of-round condition or slightly bent ends can be accommodated without fear of damage to the cutter device. It is also apparent that the pipe reamer 27 could be similarly mounted for the same reason although this usually is not necessary.

Figure 6:
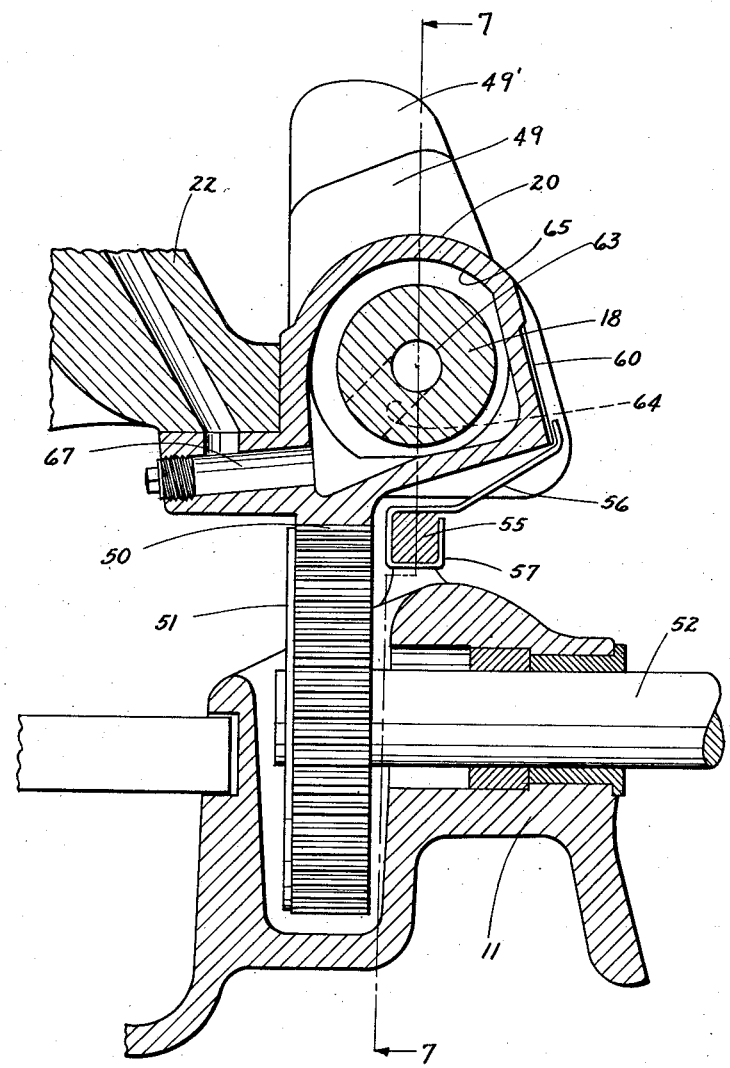
Fig. 6 is a detailed partial sectional view from line 6—6 of Fig. 2 drawn to an enlarged scale.
Figure 7:
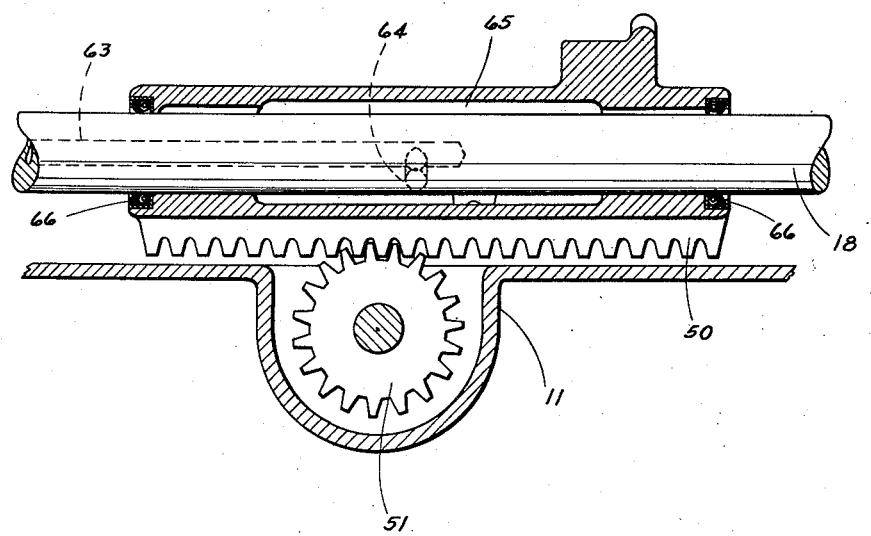
Fig. 7 is a sectional view along line 7—7 of Fig. 6.
Figure 7A:
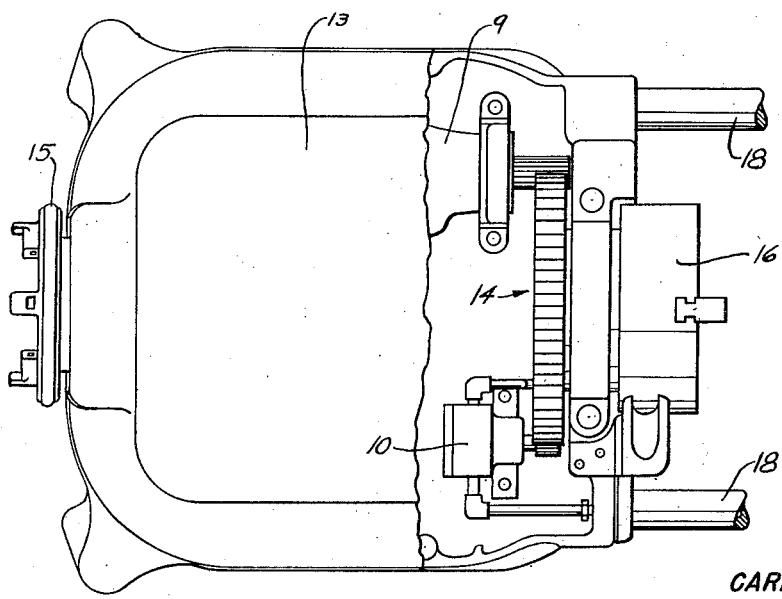
Fig. 7A is a partial top plan view with a part broken away.

The means for moving the carriage of this embodiment of my invention takes the form of a rack and pinion arrangement (Figs. 6 and 7). The rack 50 is formed on the front longitudinal member 20 with its teeth extending downwardly. The pinion 51 is mounted on a shaft 52 journalled in the base 11. A hand wheel 53 on the shaft provides the means to turn the pinion.

On the front of the base 11 directly beneath the front bar 18 is mounted a square or other flat sided member 55. An indexing tab 56 is slidably disposed on this member. The tab 56 has a collar 57 wrapped around the member 55 so as to engage the flat sides to prevent turning, and is pressed tightly enough to be smoothly manually adjustable and to hold its adjustment resiliently. The tab extends outwardly and upwardly from the collar 57 and terminates adjacent the front longitudinal carriage member 20 where it may be grasped conveniently by the operator of the machine.

A scale 60 is marked or fixed on the front of the member 20 in the region adjacent the extension of the tab 56. This scale may be graduated in any convenient units, but the left hand end is preferably marked with the gage lengths of threads for the various sizes of pipes. If the rest of the divisions are inches and fractions thereof, the one inch line may also be conveniently inserted since it falls between the gage length for 1- and 1¼-inch pipe, and that for 1½- and 2-inch pipe. A pair of bosses 61 extending downwardly is formed on the carriage member 20 just beyond the scale 60 in position to engage the tab 56 to assure that the tab is always in convenient position.

It is apparent that the above described scale will be useful in threading pipe. The tab 56 can be slid along the member 55 until it touches the left hand boss 61 at the position where the threading dies begin to take their first cut. At this point, the index line on the tab is directly aligned with the zero line on the scale. As the carriage is then moved to the left in the threading operation, the operator can watch the scale and determine directly therefrom when to stop the machine or to release the cutting dies from the pipe. The scale may also be useful in cutting nipples of a certain length or in cutting from a piece of pipe, an end of a certain length to retain the desired length of pipe in the chuck 16.

In order to provide cutting oil to the work piece being operated on, an oil system is provided. The oil pump 10 pumps oil into a passage 63 formed in the front supporting bar 18. The passage extends into the bar to a point just at the center of travel of the carriage where it is intersected by a hole 64 leading to the surface of the bar 18. The front carriage member 20 is journalled on the bar 18 only at its ends, being formed with an enlarged chamber 65 between the ends. Movement of the carriage is limited so that the hole 64 always opens into this chamber 65. Thus the oil from the pump runs through the passage 63 and the hole 64 into the chamber 65. Oil seals 66 may be provided at the journalled ends of the carriage member 20.

Within the carriage, an oil passage 67 is formed extending from the chamber 65 transversely and then upward into the transverse member 22. A valve 68 (Fig. 5) preferably adapted to bypass the flow of the fluid is mounted in the transverse member 22 to control the flow of oil onto the work. The bypass type of valve is preferred since this prevents the building up of a pressure within the chamber 65 and consequent leakage of oil out of the ends.

Figure 5:
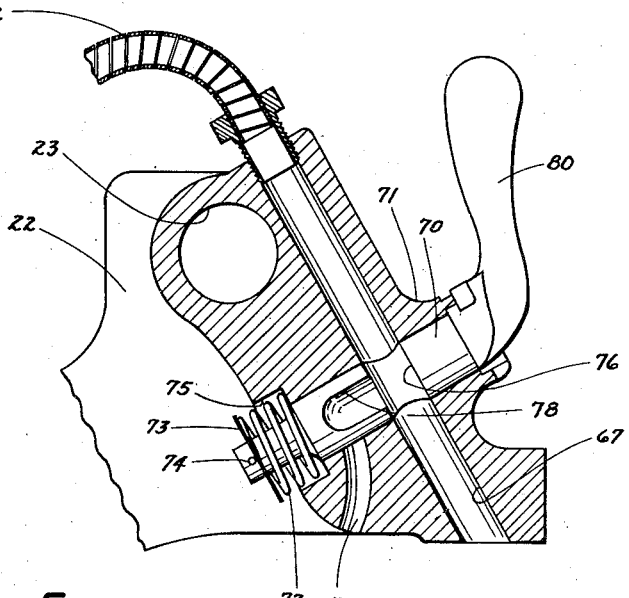
Fig. 5 is a detailed partial sectional view through the valve of the oil system drawn to an enlarged scale.

One simple preferred type of bypass valve is shown in Fig. 5. A valve barrel 70 is journalled in a boss 71 formed in the transverse member 22, and in line with the passage 67. The barrel is held in place by a compression spring 72 engaged between a washer 73 held on the barrel by a pin 74 and a counterbored surface 75 on the member 22. A transverse slot 76 adapted to be aligned with the passage 67 is formed in the barrel to allow straight through flow. Bypass flow is provided by a longitudinal slot 78 adapted to connect the lower part of the passage 67 with a bypass outlet 79. A handle 80 is provided on the barrel to turn it.

From the valve 68 the oil normally flows upward into a flexible adjustable tube 82 terminating in a nozzle 83. This tube is just long enough to allow the nozzle to be positioned at any of the pipe working tools on this carriage. Since it is mounted on the carriage, the tube need not be long but is conveniently short and requires a minimum amount of adjusting in contrast to prior devices where the oil lines were fixed to the frame.

The oil return to the pump 16 is through a screen 84 to a sump formed in the base 11 which catches the oil and from which the pump draws the oil to pump it again through the system.

In use, a pipe is inserted in the chuck 16 extending far enough to pass through the threader in which the chasers are withdrawn, past the reamer 27 which is raised out of the way, and into the cutter 35 when the carriage is moved to its position furthest to the left (Fig. 1). The chuck is tightened and the motor started for rotation in either direction for cutting the pipe by a switch at 85. The cutter wheel 43 is pressed into the pipe in a manner well known in the art and the pipe is cut. Because of the free mounting of the cutter, no special care need be taken to be sure that the pipe is straight or round or properly centered.

The carriage is then moved slightly to the right so that the cut end of the pipe is directly in the line of the reamer 27. The pipe is then rotated so that the upper surface is moving away from the operator. This is the direction which would unscrew a normal pipe from the chasers if they were engaged. With the pipe rotating in this direction, the reamer 27 is pressed down on the upper edge of the pipe. The reamer blades will then cut a slight chamfer on the end, making an easy start into the chasers possible.

After this operation, the motor is reversed by the reversing switch 85, the carriage moved to the right, the chasers closed and the indexing tab 56 set. Before each cutting operation, the nozzle 83 of the oil system may be adjusted slightly to each of the separate tools. However, since it is carried by the carriage, the adjustment is slight and none of the tools is drenched with oil by the change of position of the carriage. Because of the reversal of the motor in these operations, and the consequent reversal of direction of rotation of the oil pump, it is necessary to have some sort of reversible pump such as that disclosed in the co-pending application of Anton J. Janik, Ser. No. 161,660, filed May 12, 1950, now Patent No. 2,716,947 granted September 6, 1955.

The threads are cut in a manner well known in the art, the machine running until the proper gage line on the scale is reached. An additional signal to the operator is provided for by the open construction of the carriage. It is, therefore, possible to see the chasers easily, and if the chasers are constructed so that the full gage length of threads is cut as the end of the pipe reaches the end of the chasers, it is readily visible as a signal to the operator that the pipe is properly threaded. At the time when this point is reached, the chasers are released, thus stopping the thread cutting operation.

The pipe is then reamed by inserting the reamer into the opening and moving the carriage so that the reamer operates to cut the burrs off the inside of the pipe. The threading operation is complete at the point, but if the piece is to be a nipple, the carriage could be moved one more step and the pipe cut off.

Thus, it is apparent that a single cycle of motion from right to left and back again completes all the operations customarily performed on this type of machine. In addition, the various sub-combinations are more efficient in their individual operations than previous devices.

Figure 8:
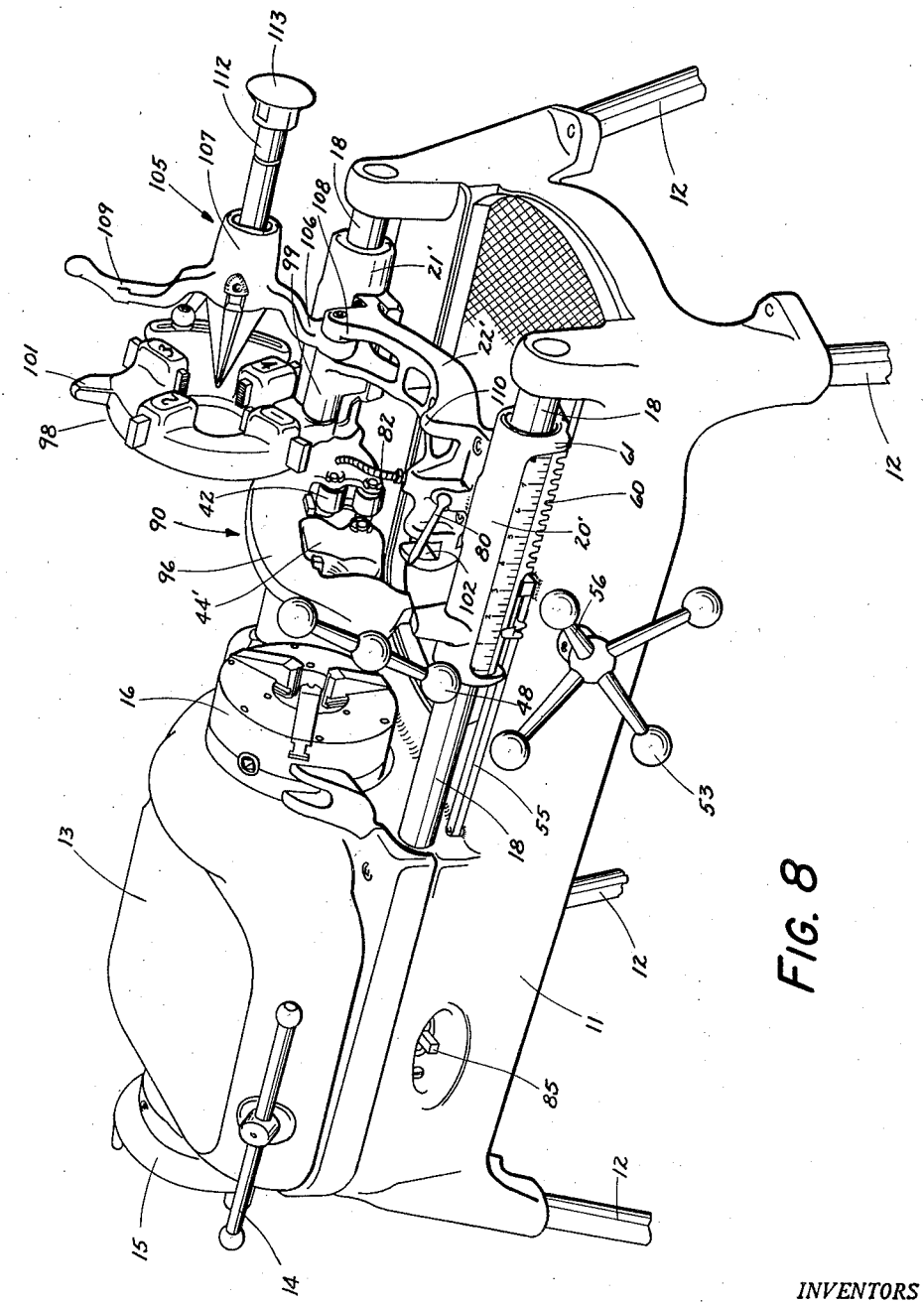
Fig. 8 is a view similiar to Fig. 1 of a second embodiment of my invention.

A second embodiment similar to that just described is illustrated in Fig. 8. In this embodiment, the framework and power unit are exactly the same as that previously described. The carriage is somewhat different, however, as are the tools carried thereby. The carriage is still composed of a front member 20' and a rear member 21' similar in most respects to the members 20 and 21 of the original carriage. The oil distributing system is also the same in the two machines.

In this second embodiment, however, the tools are arranged somewhat differently. The pipe cutter 90 is mounted in a manner the same as previously at the end of the carriage member 21' nearest the chuck 16. As illustrated, the cutter is made in a form well known in the art having a C-shaped frame 96 in which the rollers 42 are journalled and on which the housing 44' is slidably moved by the adjusting screw under the control of the handle 48. It will readily be seen that the shape of the frame and housing is not important to the novel mounting of this tool as previously described.

The threader 98 is of a type well known in the art but is mounted differently from the usual threader in a power machine by being pivoted at one side in a boss 99 formed on the cross member 22'. The other side is provided with a tongue 101 adapted to fit into a fork 102 on the front of cross member 22' which provides support for the threader. It is apparent that the threader can easily be pivoted out of the path of a pipe held in the chuck 16 if desired.

A novel reamer 105 is mounted at the end of the carriage furthest from the chuck. An arm 106 of the reamer body member 107 is pivoted on a pin in a fork 108 on the transverse member 22'. The handle 109 is adapted to abut an upstanding lugs or ear 110 formed at the other end of the member 22' when the reamer is in its lowered position.

As is best shown in Figs. 9-14, the reamer is mounted in the body member 107 on a shaft 112 which carries a knob 113 at one end and the reaming tool 114 at the other end. This shaft is slidably journalled in a hole in the housing and is kept from rotation at any but the fully extended or retracted position solely by the engagement of any one of a pair of pins 115 in the shaft with a keyway 116 in the housing. Movement of the shaft longitudinally is limited by the knob 113 and tool 114. The movement is sufficient, however, so that with the tools mounted on the carriage as shown in Fig. 8, the reamer tool 114 may be extended sufficiently to ream a pipe previously cut by the cutter 90 with little or no movement of the carriage.

In order to hold the reamer in that position and to prevent turning of the tool, the knob 113 is formed with a neck part 118 through which a pin 119 extends and secures the knob to the shaft. The neck is formed with one pair of diametrically-opposite parallel flat surfaces 120 extending from the end of the neck nearly to the knob. A second pair of parallel flat surfaces 121 is provided at an angle from the first pair. This second pair does not extend to the end of the neck 118, but instead leaves a pair of opposite abutment member 122 somewhat in the form of a truncated collar.

The body 107 at the end adjacent the knob 113 is also specially formed to co-act with the knob member. An opening 124 is formed at that end having a shape complementary to the neck end of the knob, i. e., the opening is in the shape of a circle cut by two parallel chords. This provides two flat surfaces 125 which may be slightly relieved as at 126 for the passage of the pins 115. Deeper within the body, the opening is cut away to a full circular opening 128. This leaves a pair of segmental stop pieces 129 in the opening 123.

As is best shown in Fig. 14, the knob may be inserted into the opening 123 and, upon complete insertion, turned through the angle between the two pairs of parallel surfaces 120 and 121. The abutment member 122 will then be caught behind the stop pieces 129 to prevent longitudinal movement while rotation is prevented by the engagement of the surface 121 with the surface 125 of the stop piece 129. The pins 115 are located so that in this position of the tool, they are completely out of the keyway 116. When the knob 113 is turned to be retracted, the pins 115 will again be aligned with the keyway so that the shaft may be slid to the retracted position.

Rotation of the reamer in the retracted position is prevented by means similar to those just described. The tool 114 is provided with a shank 132 which is formed with a pair of parallel flat sides 133. These sides engage the flat walls 135 of an opening 134 complementary to the shank 132 formed in the body 107. Since longitudinal force is primarily to the left (Figs. 9, 13 and 14) no abutment members or the like are necessary. However, to prevent inadvertent longitudinal motion, a spring loaded ball detent arrangement 136 is provided pressing the ball into a circumferential groove 137 in the shaft. Thus the reamer is usable in either of the two positions.

This type of reamer is particularly useful in this second embodiment of the machine as will be apparent from the following description of the operation of the machine. Before the threading of the pipe is started, the tools are all in a tilted back position. The pipe is then inserted through the chuck until the cutter is approximately at the desired point of cut-off of the pipe. The cutter may then be lowered over the pipe because of the C-shaped frame, and the exact position be adjusted by the carriage. After cutting the pipe, the cutter is raised, and the threader may be dropped, and the carriage moved the required distance to thread the pipe. However, if it is desired to ream the pipe before threading it, the reamer may be dropped, and the tool moved to its extended position and the pipe reamed first, and then threaded. The reamer is preferably tilted back for threading. When the threading operation is complete, the dies in the threader are preferably released by any means well known in the art, and the reamer may the be dropped into position and the pipe reamed with the reamer in the retracted position. Thus, it will be apparent that very little shifting of the carriage is necessary for a complete cycle of cutting, threading and reaming the pipe.

Having thus described our invention, we are aware that numerous and extensive departures may be made therefrom without departing from the spirit or scope of our invention.

We claim:

1. In a power driven pipe tool having a movable carriage, reamer means comprising a body adapted to be mounted in said carriage, shaft means disposed in said body and slidable longitudinally therein, a reaming tool fixed to one end of said shaft, knob means fixed to the other end of the shaft, said body being formed to provide openings adjacent said shaft at both ends, said knob means and tool being formed with means spaced a greater distance apart than the spacing of said openings to alternately co-act with the walls of said openings to prevent rotational and axial movement.

2. In a power-driven pipe working tool having a movable carriage; reamer means comprising a body having an arm pivotally fixed to said carriage, a handle on said body extending opposite to said arm adapted to be held by said carriage to prevent axial motion, a shaft slidably journalled in said body, a reaming tool fixed to one end of said shaft, knob means fixed to the other end of said shaft, said body being formed to provide openings adjacent said shaft at both ends, said tool being formed with a shank adapted to co-act with one of said openings to prevent rotational motion, said knob means having a neck formed to co-act with the other of said openings to restrain said tool from axial and rotational motion in one direction.

3. In a power-driven pipe-working tool having a movable carriage; reamer means comprising a body having an arm pivotally fixed to said carriage, a handle on said body extending opposite said arm adapted to be held by said carriage to prevent axial movement, said body being formed to provide an axial hole therethrough, a shaft slidably journalled in said hole adapted to be moved between an extended and a retracted position, a reaming tool on one end of said shaft, said tool having a shank with at least one pair of parallel flat surfaces, said body being formed with a first opening at one end of said hole complementary to said shank, knob means at the other end of said shaft, said knob means having a neck formed with at least one pair of flat parallel surfaces and also formed to provide a pair of diametrically opposite abutment members, said body being formed to provide a second opening at the end of the hole adjacent said knob means, said second opening having a pair of diametrically opposed stop pieces having chordal flat surfaces, said shank being engageable in said second opening with said abutment member in engagement with said stop pieces to prevent axial movement and rotational movement of said shaft in one direction in said extended position.

4. In a power-driven pipe-working tool having a movable carriage; reamer means comprising a body having an arm pivotally fixed to said carriage, a handle on said body extending opposite said arm adapted to be held by said carriage to prevent axial movement, said body being formed to provide an axial hole therethrough, a shaft slidably journalled in said hole adapted to be moved between an extended and a retracted position, a reaming tool on one end of said shaft, said tool having a shank with at least one pair of parallel flat surfaces, said body being formed with a first opening at one end of said hole complementary to said shank, knob means at the other end of said shaft, said knob means having a neck formed with at least one pair of flat parallel surfaces and also formed to provide a pair of diametrically opposite abutment members, said body being formed to provide a second opening at the end of the hole adjacent said knob means, said second opening having a pair of diametrically opposed stop pieces having chordal flat surfaces, said shank being engageable in said second opening with said abutment member in engagement with said stop pieces to prevent axial movement and rotational movement of said shaft in one direction in said extended position, said body being formed to provide a keyway along said hole, pins in said shaft slidable in said keyway to guide said shaft from its extended to its retracted position, and spring loaded detent means engageable between said shaft and said body to hold said shaft releasably in either of its positions.

References Cited in the file of this patent

UNITED STATES PATENTS

| Number | Name | Date |
|---|---|---|
| 237,224 | Wilson | Feb. 1, 1881 |
| 594,914 | Shorb | Dec. 7, 1897 |
| 780,017 | Albee | Jan. 17, 1908 |
| 1,109,957 | Bowen | Sept. 8, 1914 |
| 1,619,832 | Starr | Mar. 8, 1927 |
| 1,947,874 | Pealer | Feb. 20, 1934 |
| 2,079,179 | Pealer | May 4, 1937 |
| 2,079,181 | Pealer | May 4, 1937 |
| 2,249,395 | Reese | July 15, 1941 |
| 2,250,349 | Berquist | July 22, 1941 |
| 2,270,358 | Tewksbury | Jan. 20, 1942 |
| 2,314,016 | Peters | Mar. 16, 1943 |
| 2,415,746 | Knight et al. | Feb. 11, 1947 |
| 2,457,310 | Judelshon | Dec. 28, 1948 |